United States Patent
Camacho Cardenas et al.

(10) Patent No.: US 11,041,371 B2
(45) Date of Patent: Jun. 22, 2021

(54) ADAPTIVE PROBABILISTIC HEALTH MANAGEMENT FOR RIG EQUIPMENT

(71) Applicant: Schlumberger Technology Corporation, Sugar Land, TX (US)

(72) Inventors: Alejandro Camacho Cardenas, Houston, TX (US); Edwin Sutrisno, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 16/551,985

(22) Filed: Aug. 27, 2019

(65) Prior Publication Data
US 2021/0062619 A1   Mar. 4, 2021

(51) Int. Cl.
*E21B 41/00* (2006.01)
*G05B 13/04* (2006.01)

(52) U.S. Cl.
CPC ........ *E21B 41/0092* (2013.01); *G05B 13/048* (2013.01)

(58) Field of Classification Search
CPC .......................... E21B 41/0092; G05B 13/048
See application file for complete search history.

(56) References Cited

U.S. PATENT DOCUMENTS

| | | | |
|---|---|---|---|
| 7,925,472 B2 | 4/2011 | Nasr et al. | |
| 8,116,990 B2 | 2/2012 | Koul | |
| 8,347,957 B2* | 1/2013 | Stephenson | E21B 44/00 166/250.01 |
| 8,676,721 B2* | 3/2014 | Piovesan | G06Q 10/00 706/11 |
| 9,260,943 B2 | 2/2016 | Eriksson et al. | |
| 9,934,479 B2 | 4/2018 | Sanchez et al. | |
| 10,215,009 B2 | 2/2019 | Tjostheim et al. | |
| 10,221,674 B2 | 3/2019 | Samuel | |
| 10,287,869 B2 | 5/2019 | Jaffrey | |
| 2004/0088115 A1* | 5/2004 | Guggari | G06Q 10/06 702/13 |
| 2005/0197813 A1 | 9/2005 | Grayson | |
| 2009/0076873 A1* | 3/2009 | Johnson | G06Q 50/02 705/7.28 |
| 2014/0121973 A1 | 5/2014 | Buchanan et al. | |

(Continued)

FOREIGN PATENT DOCUMENTS

WO   2010019798 A2   2/2010
WO   2012001653 A2   1/2012

(Continued)

OTHER PUBLICATIONS

Search Report and Written Opinion of International Patent Application No. PCT/US2020/048108 dated Nov. 18, 2020; 13 pages.

*Primary Examiner* — Charles R Kasenge
(74) *Attorney, Agent, or Firm* — Jeffrey D. Frantz

(57) ABSTRACT

Systems and methods for monitoring health of systems and components of an oil rig are disclosed. Monitoring usage parameters allows for a probabilistic way to determine when rig equipment will fail. A failure probability curve based on past performance of the equipment can be used. Multiple usage metrics allow for increased accuracy and certainty of a time of failure for the equipment. Using a sufficiently high number of usage metrics allows the failure probability range to be very narrow and therefore the certainty of the prediction is high.

18 Claims, 6 Drawing Sheets

(56) References Cited

U.S. PATENT DOCUMENTS

| | | | |
|---|---|---|---|
| 2015/0022326 A1 | 1/2015 | Baxter et al. | |
| 2015/0160101 A1* | 6/2015 | Gao | E21B 41/00 |
| | | | 702/6 |
| 2015/0308191 A1 | 10/2015 | Zhan et al. | |
| 2015/0308237 A1* | 10/2015 | Zhan | E21B 43/12 |
| | | | 175/40 |
| 2015/0356521 A1* | 12/2015 | Sridhar | G06Q 10/06316 |
| | | | 705/305 |
| 2016/0032705 A1 | 2/2016 | Benson et al. | |
| 2016/0055280 A1* | 2/2016 | Devoy | G06F 30/23 |
| | | | 703/2 |
| 2016/0274551 A1* | 9/2016 | Mishra | G05B 15/02 |
| 2016/0292652 A1* | 10/2016 | Bowden, Jr. | G06Q 10/20 |
| 2016/0371957 A1 | 12/2016 | Ghaffari et al. | |
| 2017/0268323 A1* | 9/2017 | Dykstra | E21B 33/06 |
| 2017/0314369 A1* | 11/2017 | Rosano | F16P 3/142 |
| 2018/0142543 A1 | 5/2018 | Gupta et al. | |
| 2018/0293551 A1 | 10/2018 | Buca | |
| 2018/0363421 A1* | 12/2018 | Harshbarger | E21B 19/14 |
| 2019/0012411 A1 | 1/2019 | Camacho Cardenas | |
| 2019/0120023 A1 | 4/2019 | Ocegueda-Hernandez et al. | |
| 2019/0264545 A1 | 8/2019 | Camacho Cardenas et al. | |
| 2019/0360311 A1 | 11/2019 | Camacho Cardenas | |

FOREIGN PATENT DOCUMENTS

| | | |
|---|---|---|
| WO | 2013180727 A1 | 12/2013 |
| WO | 2018237378 A1 | 12/2018 |

* cited by examiner

ADAPTIVE PROBABILISTIC HEALTH MANAGEMENT FOR RIG EQUIPMENT

BACKGROUND

Drilling rigs consist of a multitude of complex equipment that can be prone to failure. Understanding the current health status of the equipment and projecting the course of damage into the future is vital in anticipating failures, often referred to as Prognostic Health Management (PrHM). When rig equipment fails during operation it causes undesired costly Non-Productive Time (NPT). There is a need in the art for an improved method for predicting, identifying, and planning failures in oil and gas operations.

SUMMARY

Figure 1:
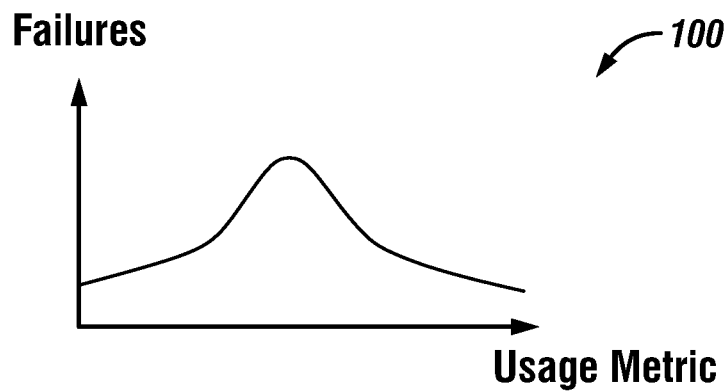
FIG. 1 is a graph of usage metric against failures according to embodiments of the present disclosure.

Embodiments of the present disclosure are directed to a system for managing health of monitored equipment for use in an oil rig. The system includes a processing unit configured to make calculations and store data, the processing unit being further configured to store and execute a usage model pertaining to the monitored equipment. The system also includes a failure information component configured to store aggregated failure information pertaining to the same or similar equipment as the monitored equipment. The system also includes a first usage measurement system configured to measure a first usage metric for the monitored equipment. The processing unit is configured to calculate via the usage model a probability of failure curve for the monitored equipment, the failure curve having a failure range defined by a first point at which the failure probability of the monitored equipment reaches a first threshold and a second point at which the failure probability of the monitored equipment reaches a second threshold higher than the first threshold. The system also includes a second usage measurement system configured to measure a second usage metric for the monitored equipment. The processing unit is configured to calculate the second usage metric into the usage model and thereby narrow the failure range.

In further embodiments the present disclosure is directed to a method for managing system health in an oil and gas rig. The method includes storing failure information for a monitored component, the failure information describing empirical conditions of failure for the same or similar components to the monitored component, measuring a first usage metric during use of the monitored component, and calculating a first failure range for the monitored component. The failure range being defined by a first failure probability at which point a first maintenance procedure is suggested and a second failure probability at which point a second maintenance procedure is suggested. The method also includes measuring a second usage metric during use of the monitored component, and calculating a second failure range for the monitored component, wherein the second failure range is narrower than the first failure range.

In yet further embodiments the present disclosure is directed to a system for monitoring operating status of a component in an oil rig. The system includes a processing unit configured to store and calculate a usage model for the component, and a failure data component configured to store empirical failure data regarding failing conditions for components similar to the component and to communicate the failure data to the processing unit. The system also includes a usage metric measurement component configured to measure one or more usage metrics pertaining to the use of the component in conjunction with the oil rig. The usage metric measurement component is configured to communicate the usage metrics with the processing unit. The processing unit is configured to include the usage metrics in a calculation of the usage model that outputs a failure probability range during which a likelihood of failure is greater than a predetermined threshold. The processing unit is further configured to include a greater number of usage metrics to narrow the failure probability range, wherein narrowing the failure probability range results in a more certain conclusion that the component will fail.

DETAILED DESCRIPTION

In PrHM, measurements and sensors are introduced to equipment to understand its health condition and likelihood of failure at a given time. Prognostics can be thought of as an extension of condition-based-maintenance by enabling the projection of the equipment's condition into the future. Prognostic methods work in steps of detection-diagnosis-forecast, as commonly done in the medical field when doctors diagnose the course of an illness. As a corollary to that principle, failure cannot be forecast until the onset of failure has been detected.

Prognostic methods have several implementation drawbacks. Firstly, they require obtaining an advanced level of information which sometimes is costly to implement and maintain. For example expensive arrays of sensors may need to be deployed on the rig equipment. The choices of the sensors need to be targeted to the specific failure modes that are to be monitored which consequently increase the number of sensors with the additional failure modes. There is data acquisition hardware that come with the sensors along with the software to process those data. These sensors and data acquisition hardware are exposed to harsh conditions on the rig which cause reliability and maintenance issues on the sensors themselves.

Secondly, it can be impractical to obtain required data due to difficult sensor placement, telemetry bandwidth, and data storage size. For example, to determine the degradation level of a mud pump valve one would have to attach an accelerometer sensor directly or in close proximity to the valve so that the data can be rid of harmful noise. Such placement may be impractical because there is no space for the sensor, and it is expensive to retrofit the existing mud pump design. The vibration data to be collected also ranges in kHz frequency which makes telemetry and storage costly. An effort to reduce the data size would require an on-site data pre-processing module which introduces an additional reliability point and limiting the ability of revising the health monitoring algorithm for improvement.

Thirdly, these methods achieve low accuracy and provide only a short predictive window. The high variability of operating conditions and the poor quality of collected data lead to large variance in the prognostic model. Putting a conservative alarm threshold on such model would produce too many false alarms and diminish the value of the health management system. Increasing the threshold to a higher confidence level often lead to late detection and short predictive window which render the information un-actionable by the user. These listed drawbacks are not an exhaustive list. Moreover, these drawbacks have a multiplicative effect when two or more of them are present.

Another method that is widely used on rigs is the time-based routine preventive maintenance. Routine preventive maintenance seeks to prevent failures by constantly performing preventive repairs or replacement on equipment, whether it is needed or not. It ignores variability in usage condition of the equipment in pursue of obtaining a simple answer as to when a maintenance needs to be scheduled. These methods can also lead to high cost of ownership, and many times fail to prevent failure modes that are poorly understood. Furthermore they do not anticipate failures, and they generally do not account for unexpected failures, making job planning difficult.

Improvements to the time-based maintenance method are typically done by replacing time with a more advanced usage metric that is a closer representation of the actual loading of the equipment. For example, instead of replacing an elastomer gasket every 6 months it is replaced every 200,000 valve cycles. Abandoning time for more advanced metrics unfortunately also carries some drawbacks. Firstly, the new metric is unintuitive and difficult to use for practical maintenance planning and job planning. Second, more advanced metrics require sensors. For example, cycle counter proximity sensor and rotation count sensor. Third, introducing physics of failure variables into a new advanced metric will result in absolutely un-actionable information to the user. Consider a hypothetical example of developing a usage metric for a gasket that is a based on a mathematical function of valve cycle count, pressure and temperature. The outcome would tell the operator to replace the gasket every 150,000 cycle.degF.psi which is impossible to interpret by human. Furthermore, developing such model presents a challenge from data and modeling perspectives which are addressed by the present invention.

The systems and methods of the present invention are directed to a health management framework that unifies data sources and probabilistic failure prediction methods which makes possible a practical implementation of advanced usage models therefore addressing the challenges related to PrHM and the time-based maintenance. The disclosed systems and methods also propose a methodology of automatic updates as soon as new data arrives with minimal human effort in the loop to make the technology practical to implement on rigs which have hundreds of components to monitor. The unification of data and methodologies in this disclosure allow algorithmic results to be converted into context-based answers that are actionable for rig maintenance planning and future mission planning.

FIG. 1 is a graph 100 of usage metric against failures according to embodiments of the present disclosure. The probability of failure is initially estimated by the failure probability density function (PDF) of each and any component or group of components used in an oil and gas operation. The usage metric can be any measurable event such as revolutions, pressure cycles, distance travelled, throughput, etc. Different components will have different usage metric or metrics. The failure PDF is generated by fitting an equation over the failure distribution. Most components will have a basic Gaussian distribution.

The basic model is applied to population of components that can be practically assumed to fail by the same wear-out mechanism and experience the same usage conditions therefore forming a Gaussian failure distribution. Variations in the failure time form the center and spread of the distribution quantified by the statistical mean and variance of the distribution. The variations can be attributed to the variation of build quality of the components. The initial mean and variance data are used to fit a Gaussian PDF curve. The failure PDF curve is then transformed into a failure probability curve based on the cumulative failure probability over the usage metric as is shown in FIG. 2.

Figure 2:
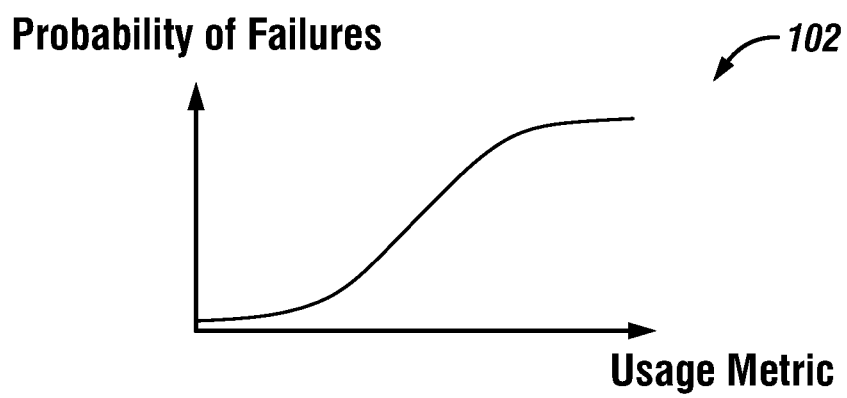
FIG. 2 shows a graph of probability of failure against usage metric according to embodiments of the present disclosure.

FIG. 2 shows a graph 102 of probability of failure against usage metric according to embodiments of the present disclosure. The probability of a component's failure at a current usage metric is therefore dependent on how much usage it has seen so far when compared against failure points of its peers. Examples of what can be considered a failure (which can vary depending on component) include: complete inability to perform intended function; function performance degraded below acceptable levels; function degraded below safe levels or levels creating a safety risk; and in performing the function the component generates unacceptable byproducts such as noise, vibration, heat, material discharge, and movement.

In conventional systems a usage metric is limited to one dimension. The metrics are carefully chosen to be simple and intuitive enough for operators to understand in context. Examples of basic usage metrics include:
1. Absolute time since the component or equipment was installed on the rig;
2. Accumulated time the component or equipment has been running (turned on) which is the basis of typical time-based maintenance;
3. Number of cycles the component or equipment has experienced (reciprocating movements, revolutions, warm-up/cool-down transitions, open/close, load/unload, etc.;
4. Number of times the component has been turned on/off.

The data unification framework in some system health monitoring systems, such as Schlumberger's ADAPROHM™ system, enables the failure probability to automatically update to the latest maintenance event. For example, every time a component fails, gets replaced, or has maintenance performed on it, the usage metric gets adjusted according. A data processing unit automatically recalculates the failure distributions and failure probability curves and current components failure probability and report it via a user interface.

Figure 3:
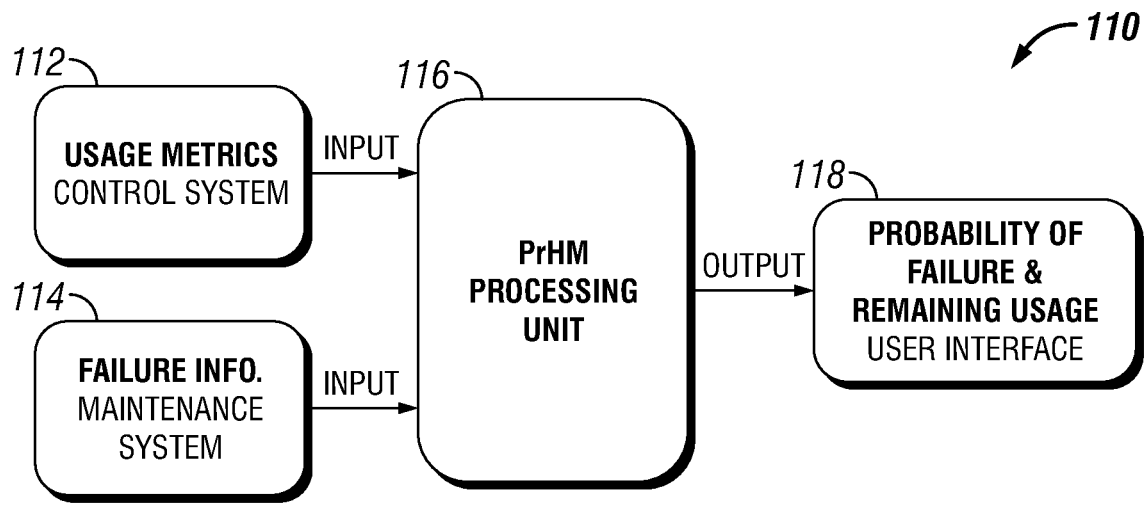
FIG. 3 is a schematic block diagram of a system according to embodiments of the present disclosure.

FIG. 3 is a schematic block diagram 1 of a system 110 according to embodiments of the present disclosure. The system 110 can comprise one or more computers that operate together to carry out the objectives of the system. Virtually any computational system is possible, including a server, a client, a smartphone, a terminal, or many others. The system 110 includes usage metrics 112 that are gathered by a control system. The control system can be any suitable telemetry or measurement devices such as but not limited to pressure and temperature gauges, odometers, tachometers, strain gauges, or the like.

The usage metrics 112 can be many different metrics that are relevant to the operation of the component, and the usage metric 112 will vary accordingly. The system 110 also includes failure information 114 that is related to the probabilistic failure information for the components that are being monitored by the system 110. The failure information 114 is related to how, when, and under what conditions the component has failed, gathered over a period of time by empirical data for previously-used components that are similar to the components being monitored in a certain case. For example, if the component is a mud pump, similar (or identical) mud pumps have been used in the past that are made by the same manufacturer and are virtually identical. The time of failure for the mud pumps is recorded and together compiled into the failure information 114. The failure information 114 and the usage metrics 112 are fed to a processing unit 116 that is configured to combine the data together and to run a model that is a predetermined calculation from which a probability of failure and remaining usage 118 can be produced at a user interface locally or remotely.

Figure 4:
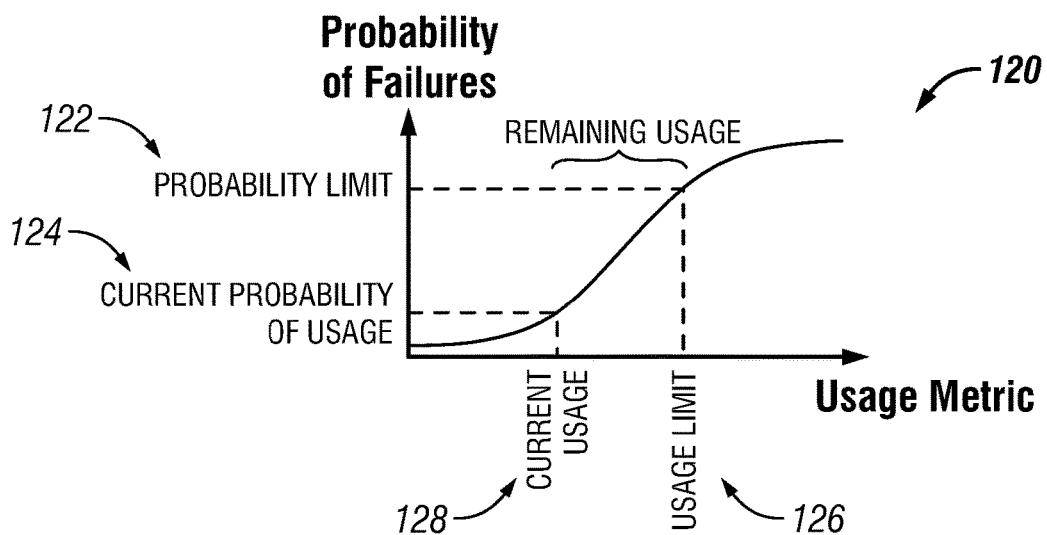
FIG. 4 is a graph of probability of failure against usage metric according to embodiments of the present disclosure.

FIG. 4 is a graph 120 of probability of failure against usage metric according to embodiments of the present disclosure. There can be a probability limit 122 that defines a point at which failure is likely and an operational decision should be made. The definition of "failure" and the probability at which this limit is reached can be different for different equipment. At any given time there is a current probability of failure 124. Similarly, there is a usage limit 126 that can be arbitrarily defined or defined based on empirical data gathered over a history of performance and lifetimes for a given component. The current usage 128 is tracked via sensors or monitors or other measuring equipment. The remaining usage 129 is the difference between the current usage 128 and the usage limit 126. The components subject to these systems and methods can include virtually any component or groups of components for an oil and gas operation, including: top drives, draw-works, mud pumps, hydraulic power units, pipe handler systems, generators, agitators, mixers, tanks, motors, pumps, blowers, engines, sensors, cameras, lights, blow-out preventers, computers, actuators, valves, etc., and each of their components and sub-components.

Figure 5:
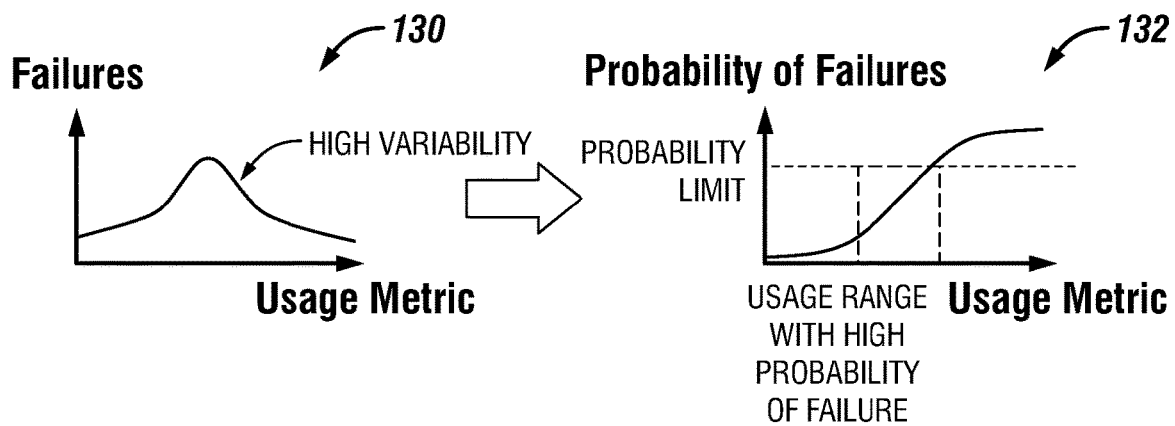
FIG. 5 is a graph of failures against usage metric and an associated probability of failure.
Figure 6:
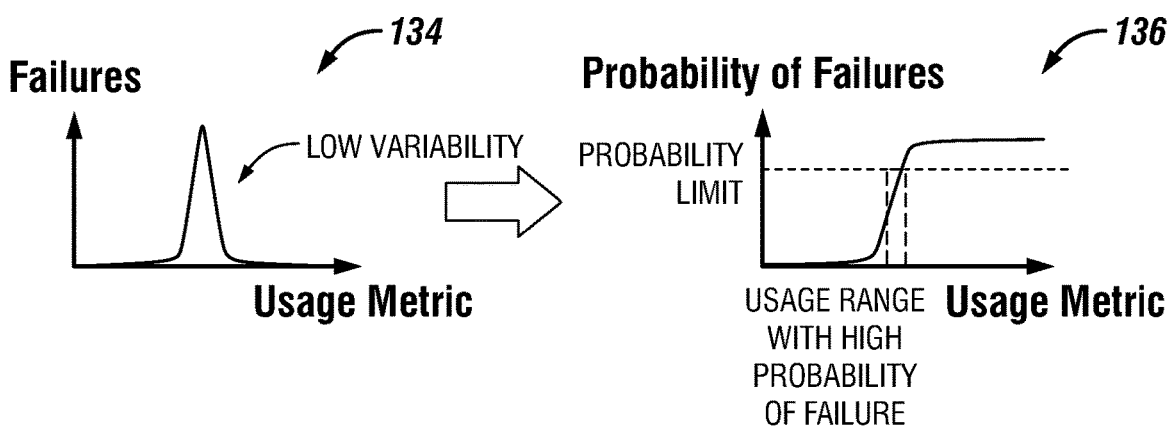
FIG. 6 is comparative graphs to those shown in FIG. 5 but with much less variability.

FIG. 5 is a graph 130 of failures against usage metric and an associated probability of failure 132. Some equipment has great variability on its failure distribution curve when ignoring variations in operating conditions. The greater the variability, the more uncertain is the time at which the component will fail, or at least when the probability of failure raises above acceptable levels. FIG. 6 is comparative graphs to those shown in FIG. 5 but with much less variability. The usage range with a high probability of failure is much shorter, thereby allowing a decision to be made to repair, retire, or perform maintenance or intervention without sacrificing a long period of operability and useful life.

In some embodiments of the present disclosure, a usage model can be implemented that considers multiple usage variables in addition to time or cycles to obtain a failure distribution with far less variability. Activities performed by a given component will not necessarily result in the same actual impact on the device. For example, a piston which operates in a cyclical manner, back and forth in an engine or mud pump. Some strokes are subject to a heavy load, while some are not. The heavily-loaded strokes will result in more wear than the light ones. Using only a usage metric of "cycles" will not capture the load on the cycle. Including a second usage metric "load" results in a more accurate picture of the wear on the component. The usage metrics can be combined into a compound unit, such as cycle-pounds for example. This usage metric will result in much less variability and therefore a more informed and accurate decision can be made regarding the retirement or maintenance of the component.

Figure 7:
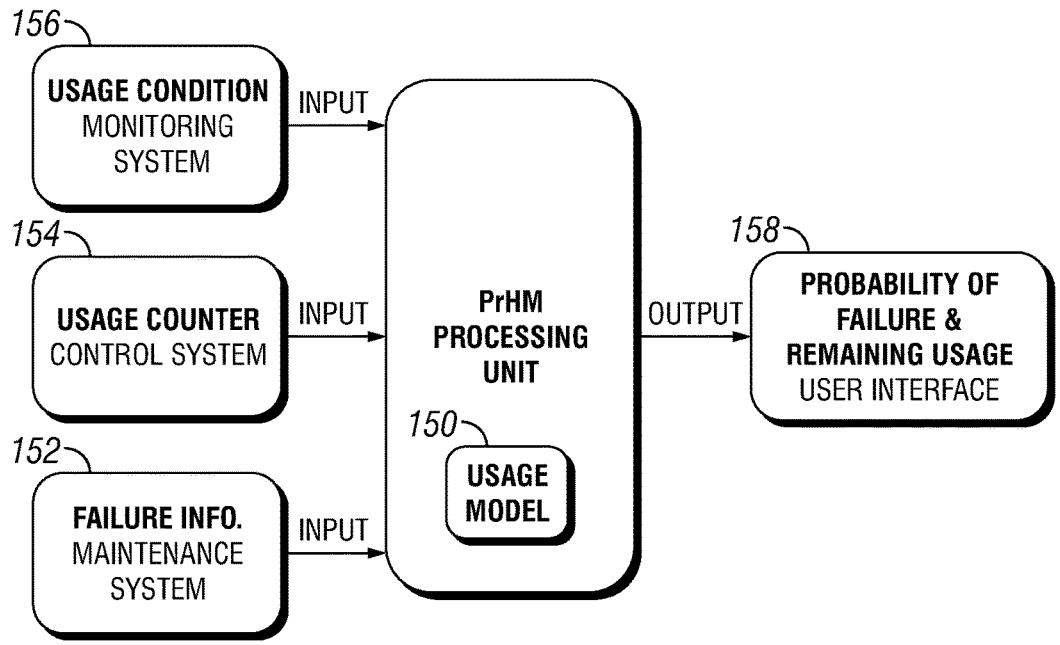
FIG. 7 shows a chart illustrating operation of a usage model according to embodiments of the present disclosure.

FIG. 7 shows a chart illustrating operation of a usage model 150 according to embodiments of the present disclosure. The usage model 150 can receive input in the form of failure information 152 from a maintenance system, from a first usage metric 154 from a control system for example, and from a second usage metric 156 from a monitoring system. The usage model 150 can be configured to output a probability of failure/remaining usage model 158 which can be given in terms of a beginning and ending of a probability of failure band. The beginning can correspond to the first time at which the component is at risk, and the end can be the time at which failure reaches a second, higher risk threshold. The thresholds can be predetermined based on failure models and other information regarding the component in question. There can be any desired number of probability thresholds generated by the model, and an equally high number of actions that are taken as a result. For example, a first threshold can be relatively low in an area where the potential for damage from a failure is particularly high, and the action can be to initiate a monitoring device that will begin to monitor a condition after reaching the threshold. A second threshold can be created at which a more invasive action is carried out.

The threshold and the action taken in response can be chosen based on engineering knowledge of the system, or it can be based on probabilistic failure information gathered over time and familiarity with the components. In some embodiments a deep learning or artificial intelligence component can be used to generate the probability thresholds and the actions assigned to each. A designer of the model can decide which parameters affect the usage metrics, and then a computer algorithm can analyze historical data to fit the best mathematical functions that produce the lowest variance in usage metric distribution. In other embodiments a computer algorithm can run a learning iterative cycle to determine both the parameters and their mathematical functions that better affect the usage metric to satisfy a target. Any two or more of these methods can be combined.

In some embodiments a designer of the model can assign a weight to individual usage metrics based on their importance to the conclusion. The resulting usage metric function is a weighted average of the several usage metrics for a given component. An algorithm can be run to adjust and optimize the weights to achieve a more accurate failure function. One example of this is:

Usage Metric=Stroke
Counter*Pressure^1.1*Temperature^1.2

Wherein the pressure has a weight of 1.1 and temperature 1.2, showing that temperature is marginally more impactful on the usage metric than pressure.

Figure 8:
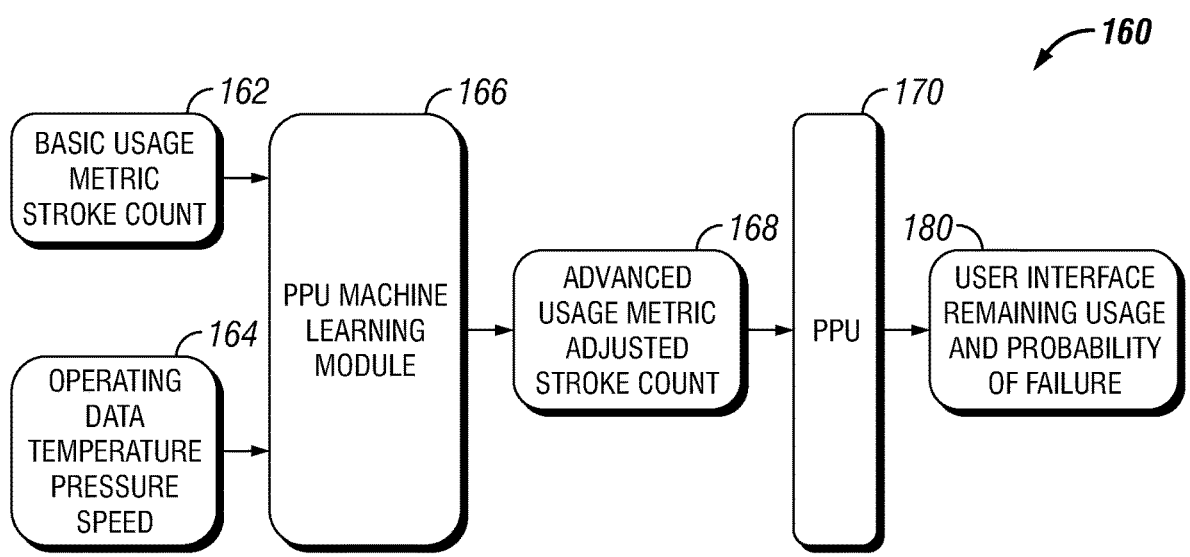
FIG. 8 is a schematic flow chart diagram of a system according to embodiments of the present disclosure.

FIG. 8 is a schematic flow chart diagram of a system 160 according to embodiments of the present disclosure. The system 160 includes a basic usage metric component 162 configured to track, record, and convey information pertaining to usage of a component to be monitored by the system 160. The component can be any component or group of components used in an oil and gas operation, such as a mud pump, top drive, drawworks, or any other system or group of systems used in an oil and gas operation. The system 160 also includes an operating data component 164 configured to monitor operating data. In this embodiment, the operating data component 164 is configured to record temperature, pressure, and speed. It is to be appreciated that other parameters can be monitored by the operating data component 164.

The system 160 also includes a PrHM Processing Unit Learning Module (PPULM) 166 configured to receive input from the basic usage metric component 162 and the operating data component 164. The PPULM 166 is configured to store weighting data to augment or diminish the effect of variables received from the basic usage metric component 162 and the operating data component 164. The PPULM 166 can also be configured to review past data pertaining to usage of similar components in the past to make the weighting decisions based on the past data. The PPULM 166 is configured to create an advanced usage metric 168 and deliver it to a PrHM Processing Unit (PPU) 170. The PPU 170 is configured to generate a remaining usage and probability of failure and deliver it to a user interface 180. In the example given above, the basic metric from the basic usage metric component 162 can be the strokes of a piston, and the advanced usage metric 168 can be the stroke multiplied by the load on the stroke. Any other combination of usage metrics and operating data can be handled by the system 160.

Figure 9:
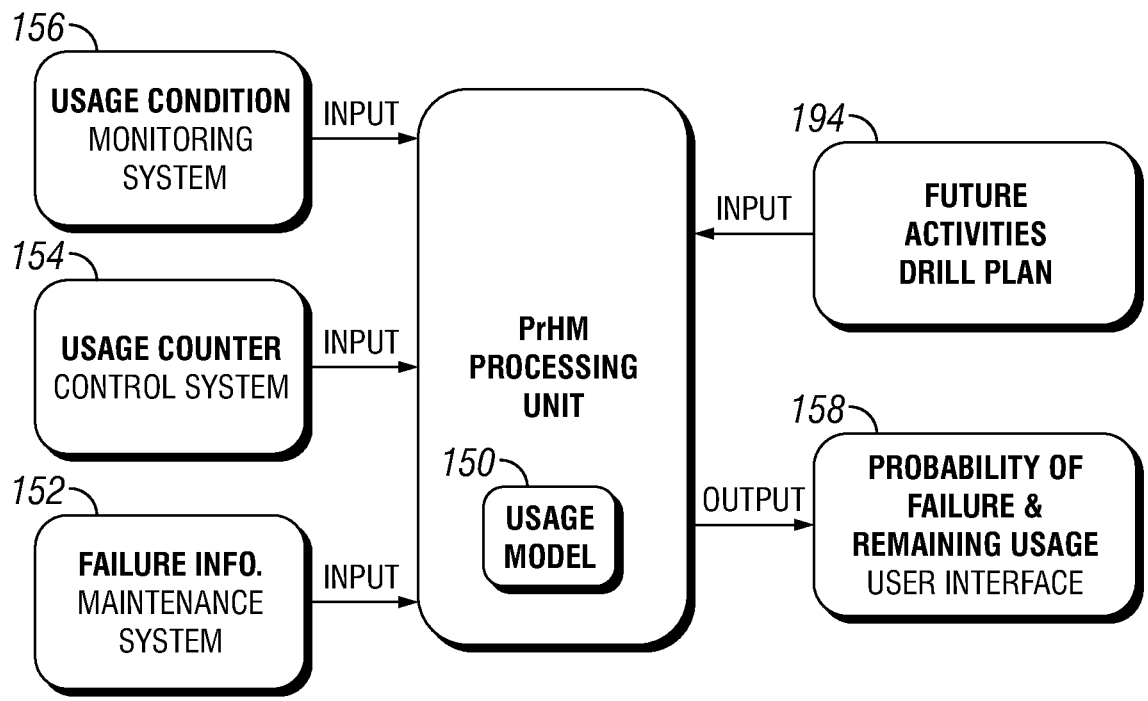
FIG. 9 shows a schematic diagram of how a PrHM system may operate according to embodiments of the present disclosure.

FIG. 9 shows a schematic diagram of how a PrHM system may operate according to embodiments of the present disclosure. FIG. 9 is similar to FIG. 7 with the addition of a future activities component 194. For the end user, knowing how much remaining usage quantified in usage metric may be difficult to discern. There is more value in getting remaining usage in terms of context-based remaining life, such as for example time based-remaining life. (e.g. the piston has two weeks of life left) or event-remaining life (e.g. the iron roughneck teeth have gripping 100 pipes worth of life left). To translate the remaining usage into context-based remaining life, the future usage of the component can be known. The rig's future activities are understood and contained in a drill plan that can be stored in memory in part of the system or can be received on demand from a remote server or other repository. With the future activities listed, the PrHM system can translate current remaining usage into context-based remaining life. The PRHM will contain a database pairing set of activities and with their corresponding set of parameters with historical consumed usage metrics. The database will in effect be a look-up table in some embodiments from where a given activity will tell the consumed usage metric per unit of time the activity is performed.

Figure 10:
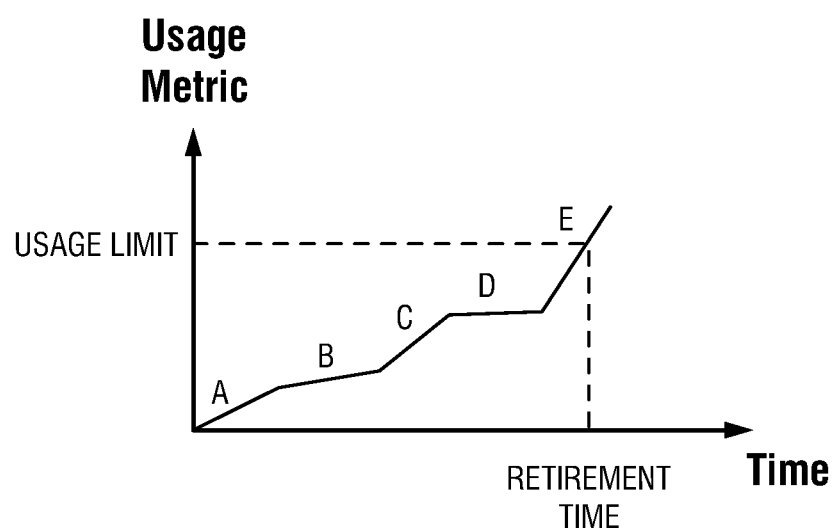
FIG. 10 is a graph of usage metric against time according to embodiments of the present disclosure.

FIG. 10 is a graph of usage metric against time according to embodiments of the present disclosure. Many activities on an oil rig have a certain, known rate of usage and a time period of use. The graph shows activities A, B, C, D, and E. Each has a different slope representing the rate at which each activity consumes the component. Activity E consumes resources more quickly than Activity D, for example. The graph also shows a usage limit. The point in time where the anticipated consumed usage intersect with the usage limit represents the time-based remaining life of the component. The drill plan can be adjusted accordingly if there is a need to delay or accelerate the retirement time. Perhaps there is a desire to retire multiple components at a similar time to take advantage of the down time for maintenance. The activities can be added or removed or changed in order to accommodate such a maintenance plan.

Figure 11:
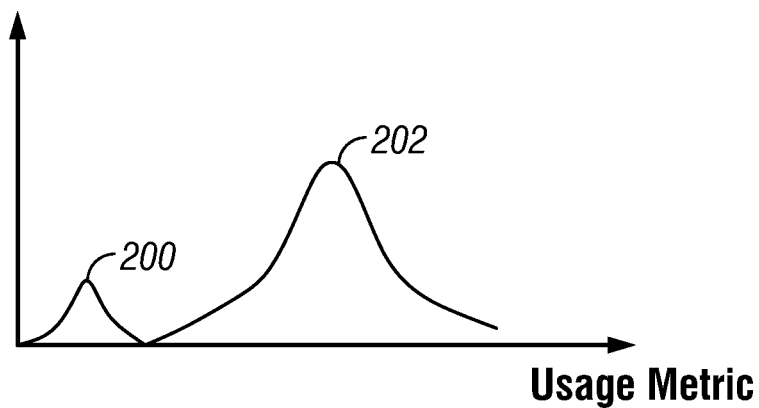
FIG. 11 is a graph of failures against usage metric according to embodiments of the present disclosure.

FIG. 11 is a graph of failures against usage metric according to embodiments of the present disclosure. In contrast to the graphs in FIGS. 1 and 2, this graph shows a bimodal character with two peaks, a first peak 200 and a second peak 202. There are many ways for such a complex profile to take place, one of them is shown here is an infant mortality curve. During manufacture, some components are manufactured with flaws which manifest early in life, causing the early failures. Those who survive the early period experience a longer life time and experience a curve similar to what is shown in FIG. 1. The case of infant mortality can be dealt with by excluding those components which fail at the early stage. Once a piece of equipment survives beyond the "infant mortality" time or cycle point, the early peak can be ignored. There are many other possible situations where a diversion from the normal, Gaussian distribution takes place. Some are more common than others and their causes are more known. Those that are known or are more common can be dealt with appropriately.

In another aspect of the present disclosure, an aggregation of components can be made. Many components are comprised of one or more subcomponents. Aggregation of probabilities of failure can be achieved to create a single probability of failure for a hierarchy of components, including subcomponents. Suppose a piece of equipment has 20 subcomponents. Each can have its own PrHM tracking with probability of failure. The equipment as a whole can then have a probability of failure (and a usage metric) based on the aggregation of the 20 individual values of each of its constituent components. Similarly, the equipment may itself belong to a higher-level system made of multiple pieces of equipment where the system itself can have an aggregated probability of failure based on the individual probability of failure and usage metrics of it subcomponents.

Figure 12:
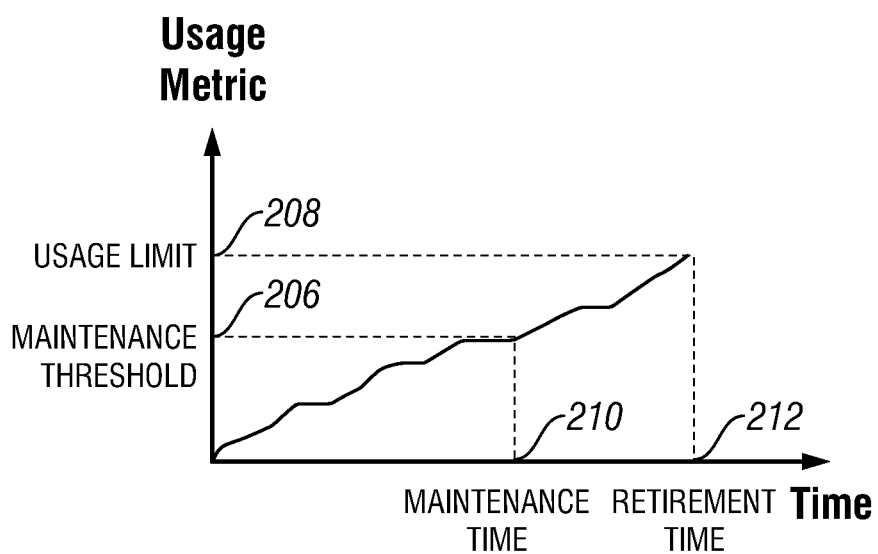
FIG. 12 is a graph of usage metric against time according to embodiments of the present disclosure.

FIG. 12 is a graph of usage metric against time according to embodiments of the present disclosure. Tracking the components probability of failures, usage metrics, and remaining life can be used as decision-making tools on managing rig operations. Once a threshold on the probability of failure, usage metric, and/or remaining life is exceeded, maintenance work is scheduled. The maintenance threshold 206 is set lower than the usage limit 208, and when the maintenance threshold 206 is met the equipment gets an order for maintenance. While the usage metric is between the maintenance threshold 206 and the usage limit 208, the equipment can be used and has a pending maintenance order. Once it has reached the usage limit 208, it cannot be used. Accordingly, there is a maintenance time 210 and a retirement time 212 This type of a system and methods allow maintenance to be moved away from a schedule-based approach, to actual usage based approach. Moreover, understanding equipment usage and the timing of maintenance helps to better plan for equipment, personnel and spare parts availability.

Figure 13:
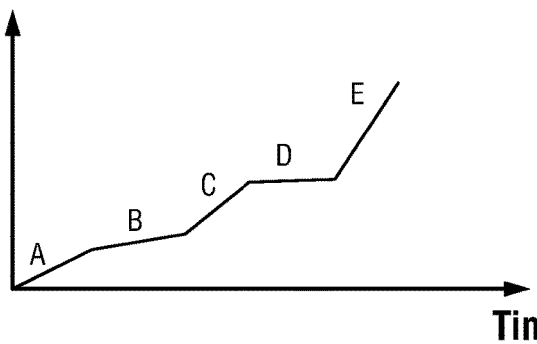
FIG. 13 is a graph of usage metric against time according to further embodiments of the present disclosure.
Figure 14:
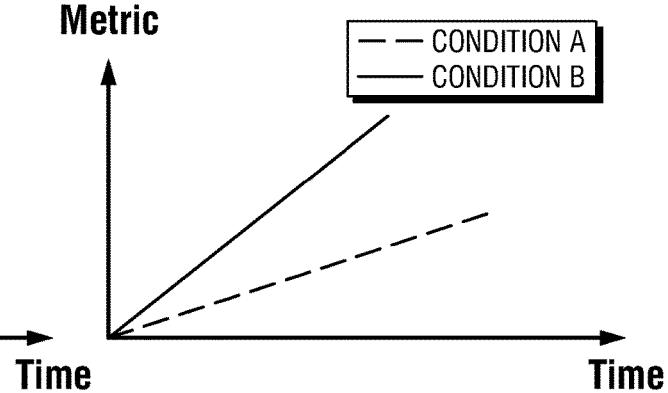
FIG. 14 shows a graph of usage metric against time with two conditions A and B, wherein conditions B are more resource-intensive than conditions A.

FIG. 13 is a graph of usage metric against time according to further embodiments of the present disclosure. There are a series of tasks A-E, each having its own usage rate represented by the steepness of the chart at each segment. Steeper is a higher usage rate. A set of drilling activities A-E each have an associated and quantified risk of failure. The rig operator can decide how to stack the mission profile and when it is best to insert a maintenance window between sequences based on where the usage metric will be at different stages of the operation. There are some operations that can be reordered, and some that cannot. The tasks can be aggregated into sub groups of tasks where there is limited or no ability to change the order of the tasks. In another embodiment the operator is given the ability for altering a usage metric to perform an activity using conditions that consume equipment life at a different rate if doing so provides another advantage such as meeting a deadline. FIG. 14 shows a graph of usage metric against time with two conditions A and B, wherein conditions B are more resource-intensive than conditions A. The operator can choose how to operate the equipment to meet a scheduling constraint or to synchronize maintenance windows.

Figure 15:
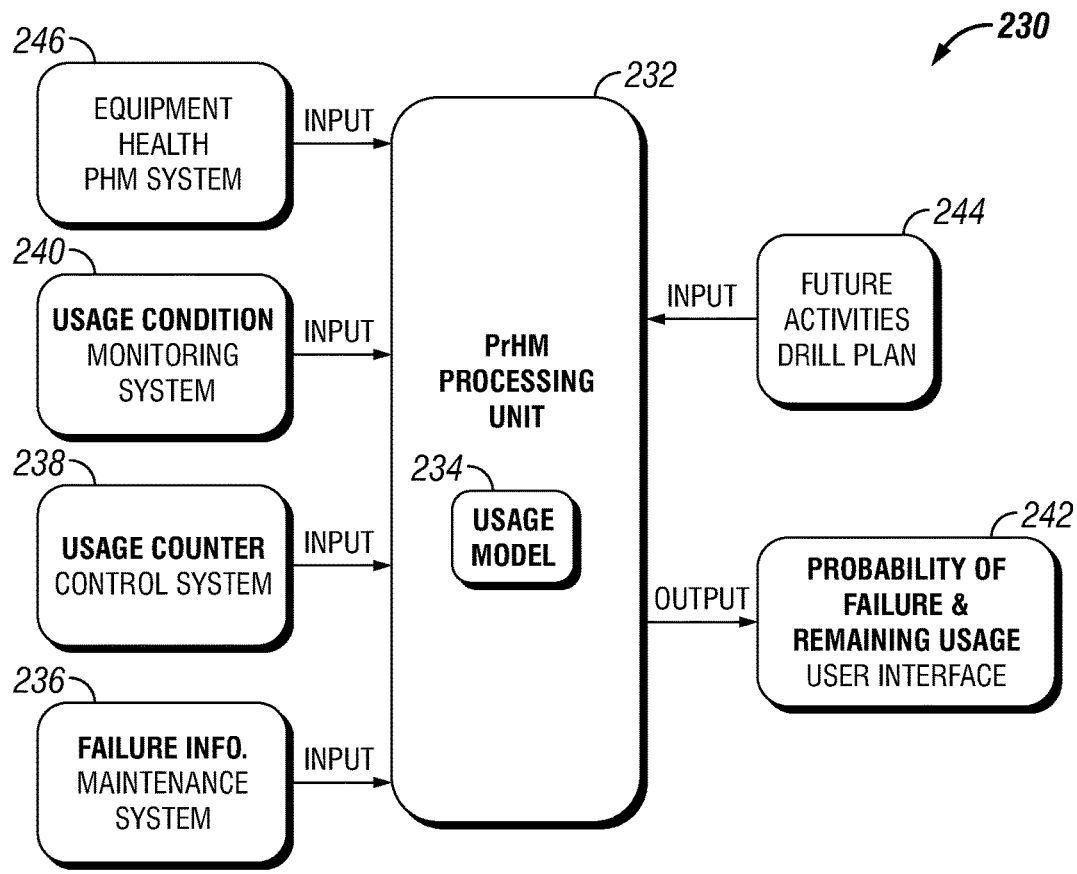
FIG. 15 is a schematic block diagram of a PrHM system according to embodiments of the present disclosure.

FIG. 15 is a schematic block diagram of a PrHM system 230 according to embodiments of the present disclosure. Components of the system 230 can be generally analogous to the system shown in FIG. 9. The PrHM processing unit (PPU) 232, the usage model 234 running on the PPU, can be generally similar to components shown in FIG. 9. The PPU 232 can receive failure info 236, usage counter 238, usage conditions 240, and future activities 244. The PPU 232 can then produce a probability of failure and remaining usage 242 via a user interface. The PPU 2232 of the system 230 can also receive equipment health 246 from a Prognostic Health Management (PHM) component. The equipment health 246 can be an intentional redundancy that gives a more direct measurement. An example of such equipment health 246 can be a fire alarm. If there is an actual fire or some other urgent condition, a direct measurement can be useful to prevent large losses. The PrHM systems shown and described herein can be overridden by a fire alarm.

In other embodiments the two models can be fused together by averaging them to arrive at a more considered result. The system health 246 data can be weighted higher if it is indeed related to an urgent situation such as a fire.

The invention claimed is:

1. A system for managing health of monitored equipment for use in an oil rig, the system comprising:
a processing unit configured to make calculations and store data, the processing unit being further configured to store and execute a usage model pertaining to the monitored equipment;
a failure information component configured to store aggregated failure information pertaining to the same or similar equipment as the monitored equipment;
a first usage measurement system configured to measure a first usage metric for the monitored equipment;
wherein the processing unit is configured to calculate via the usage model a probability of failure curve for the monitored equipment, the failure curve having a failure range defined by a first point at which the failure probability of the monitored equipment reaches a first threshold and a second point at which the failure probability of the monitored equipment reaches a second threshold higher than the first threshold, wherein the first threshold is a maintenance threshold at which point maintenance is suggested, and the second threshold is a do-not-use threshold at which point the monitored equipment is unsafe for further use;
a second usage measurement system configured to measure a second usage metric for the monitored equipment, wherein the processing unit is configured to calculate the second usage metric into the usage model and thereby narrow the failure range; and
a user interface configured to receive the probability of failure curve having the narrowed failure range.

2. The system of claim 1 wherein narrowing the failure range comprises reducing a distance between the first point and the second point.

3. The system of claim 1, further comprising a second usage measurement system configured to measure a third usage metric, and wherein the processing unit is further configured to further narrow the failure range by including the third usage metric in the usage model.

4. The system of claim 1 wherein the processing unit is further configured to receive future activities for the rig and to deliver the failure range in terms of time based on the future activities of the rig.

5. The system of claim 1 wherein the first usage metric is incongruous with the second usage metric in terms of units, and wherein the processing unit is further configured to resolve the incongruity and deliver a failure range in terms of time.

6. The system of claim 1, further comprising a learning module configured to interact with the processing unit and to adjust the failure information component with data gathered over time using the processing unit calculating failure ranges.

7. The system of claim 1, further comprising a rig planning component by which a rig operator can plan rig activities based on the failure ranges.

8. The system of claim 7 wherein the planning component is configured to allow the operator to synchronize failure ranges to synchronize maintenance timings.

9. A method for managing system health in an oil and gas rig, the method comprising:
storing failure information for a monitored component, the failure information describing empirical conditions of failure for the same or similar components to the monitored component;
measuring a first usage metric during use of the monitored component;
calculating, via a processing unit, a first failure range for the monitored component, the failure range being defined by a first failure probability at which point a first maintenance procedure is suggested and a second failure probability at which point a second maintenance procedure is suggested, wherein the first maintenance procedure comprises a reduced workload, and wherein the second maintenance procedure comprises a shutdown;
measuring a second usage metric during use of the monitored component;
calculating, via the processing unit, a second failure range for the monitored equipment, wherein the second failure range is narrower than the first failure range; and
transmitting the second failure range to a user interface.

10. The method of claim 9 wherein the first usage metric and the second usage metric have incongruous units, the method further comprising resolving the incongruous units.

11. The method of claim 9, further comprising accessing future activities for the monitored component and interpreting the failure ranges in terms of time based on the future activities.

12. The method of claim 9, further comprising determining a failure probability based on the failure information, and wherein calculating the first and second failure ranges is based on the failure probability.

13. A system for monitoring operating status of a component in an oil rig, the system comprising:
- a processing unit configured to store and calculate a usage model for the component;
- a failure data component configured to store empirical failure data regarding failing conditions for components similar to the component and to communicate the failure data to the processing unit;
- a usage metric measurement component configured to measure one or more usage metrics pertaining to the use of the component in conjunction with the oil rig, wherein the usage metric measurement component is configured to communicate the usage metrics with the processing unit;
- wherein the processing unit is configured to include the usage metrics in a calculation of the usage model that outputs a failure probability range during which a likelihood of failure is greater than a predetermined threshold;
- wherein the processing unit is further configured to include a greater number of usage metrics to narrow the failure probability range, wherein narrowing the failure probability range results in a more certain conclusion that the component will fail; and
- a user interface configured to receive the narrowed failure probability range.

14. The system of claim 13 wherein the usage metrics comprise at least one of pressure, temperature, time, cycles, distance, load, torque, distortion, deformation, or chemical properties.

15. The system of claim 13 wherein the component comprises a plurality of subcomponents, wherein the processing unit is configured to perform a calculation of the usage model for at least some of the subcomponents and to aggregate the calculations into a single failure probability range.

16. The system of claim 13, further comprising a time prediction component configured to access a plan for future activities of the component and to interpret the failure probability range into a time prediction for failure of the component.

17. The system of claim 13, further comprising a failsafe equipment health monitor configured to measure a critical usage metric, wherein the processing unit is configured to receive an override instruction from the failsafe equipment health monitor.

18. The system of claim 13, further comprising a usage metric adjustment component configured to present to an operator an adjustment to operation of the component that will alter at least one of the usage metrics, wherein the processing unit is configured to output an updated failure probability range in response to the altered usage metrics.

* * * * *